United States Patent [19]

Ikeuchi

[11] Patent Number: 4,722,424
[45] Date of Patent: Feb. 2, 1988

[54] ANTI-SQUEAL SHIM IN A DISC BRAKE

[75] Inventor: Takahiro Ikeuchi, Susono, Japan

[73] Assignee: Toyota Jidosha Kabushiki Kaisha, Aichi, Japan

[21] Appl. No.: 54,038

[22] Filed: May 26, 1987

Related U.S. Application Data

[63] Continuation of Ser. No. 780,084, Sep. 25, 1985, abandoned.

[30] Foreign Application Priority Data

Oct. 31, 1984 [JP] Japan ............................ 59-165261[u]

[51] Int. Cl.$^4$ ...................... F16D 65/02; F16D 69/00; F16D 11/10
[52] U.S. Cl. .............................. 188/73.37; 188/250 E; 192/30 V
[58] Field of Search ............... 188/73.35, 73.36, 73.37, 188/73.38, 250 B, 250 E, 258, 72.4, 250 R, 264 G; 192/30 V

[56] References Cited

U.S. PATENT DOCUMENTS

| | | | |
|---|---|---|---|
| 3,490,563 | 1/1970 | Hahm | 188/73.37 |
| 3,848,708 | 11/1974 | Noguchi | 188/73.37 |
| 4,155,430 | 5/1979 | Kawamura | 188/73.37 |
| 4,527,668 | 7/1985 | Davidson | 188/73.38 |

FOREIGN PATENT DOCUMENTS

| | | | |
|---|---|---|---|
| 0138081 | 4/1985 | European Pat. Off. | 188/73.37 |
| 2602798 | 7/1976 | Fed. Rep. of Germany | 188/73.37 |
| 2913994 | 10/1979 | Fed. Rep. of Germany | 188/73.37 |
| 558237 | 6/1978 | Japan . | |
| 567132 | 5/1979 | Japan . | |
| 1206426 | 9/1970 | United Kingdom | 188/73.37 |
| 2022733 | 12/1979 | United Kingdom | 188/73.37 |
| 2127918 | 4/1984 | United Kingdom | 188/264 G |

Primary Examiner—Andres Kashnikow
Assistant Examiner—Robert J. Oberleitner
Attorney, Agent, or Firm—Parkhurst & Oliff

[57] ABSTRACT

An anti-squeal shim interposed between a brake pad with a backing plate attached thereto, and a piston of circular transverse cross sectional shape, in a disc brake wherein the piston is slidably received in a cylinder portion of a caliper such that the centerline of the piston is parallel to an axis of rotation of a disc rotor, the piston being moved with a brake fluid pressure applied to the cylinder portion, and urging the brake pad against a friction surface of the disc rotor to thereby restrain a rotary movement of the disc rotor. The anti-squeal shim is gripped, upon application of the brake fluid pressure to the cylinder portion, only by radially-outer portions of opposite abutting surfaces of the piston and the backing plate which are spaced from the centerline of the piston in a radially outward direction of the disc rotor.

5 Claims, 9 Drawing Figures

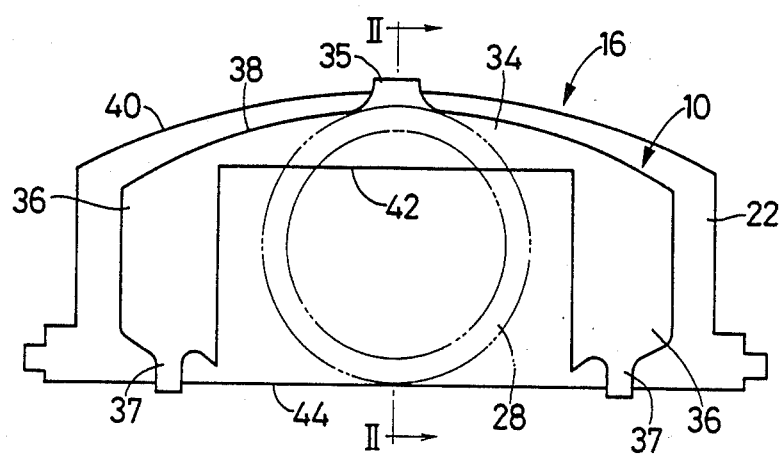
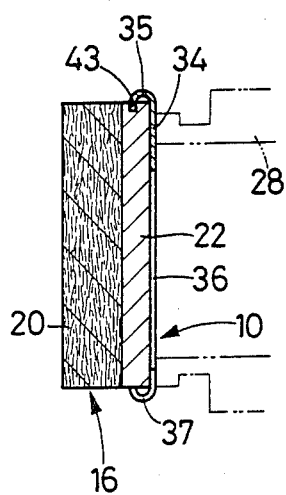
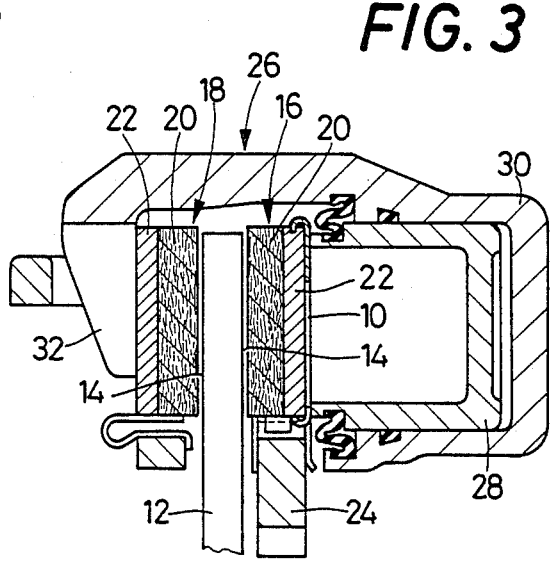

ANTI-SQUEAL SHIM IN A DISC BRAKE

This is a continuation of application Ser. No. 780,084 filed Sept. 25, 1985, now abandoned.

BACKGROUND OF THE INVENTION

1. Field of the Art

The present invention relates to an anti-squeal shim used in a disc brake for preventing a high-pitched, piercing brake noise.

2. Related Art Statement

In a common disc brake of caliper type, a piston having a circular transverse cross sectional shape is slidably received in a bore in a cylinder portion of a caliper such that the centerline of the piston is parallel to an axis of rotation of a disc rotor. Upon application of a brake fluid pressure to the cylinder portion, the piston is moved to urge a brake pad against a friction surface of the disc rotor, to thereby restrain a rotary movement of the disc rotor. In such type of disc brake, the brake pad and the disc rotor may vibrate, during application of a brake, and generate a high-pitched, piercing brake noise, so called "brake squeal". To prevent the "squeal", it has been practiced to use an anti-squeal shim having a relatively small thickness, which is interposed between the piston and a backing plate of the brake pad in order to attenuate or reduce the magnitude of vibrations of the brake pad and the disc rotor. For example, an anti-squeal shim is disclosed in Japanese Utility Model Applications which were laid open in 1980 and 1981 under Publication Nos. 55-8237 and 56-7132, respectively. The anti-squeal shim disclosed in these documents is designed to cover the entire area of the opposite abutting surfaces of the piston and the brake pad.

3. Problem Solved by the Invention

While the known anti-squeal shim disclosed in the above-identified documents is capable of preventing a squeal noise of the disc brake to some extent, its anti-squeal capability is not completely satisfactory. Other various types of anti-squeal shims have been proposed up to the present. However, none of these shims have been found satisfactory in their capability of preventing the squeal noise.

SUMMARY OF THE INVENTION

It is accordingly an object of the present invention to provide an improved anti-squeal shim for use in a disc brake, which is sufficiently capable of preventing the disc brake from producing a squeal noise.

According to the invention, there is provided an anti-squeal shim interposed between a brake pad with a backing plate attached thereto, and a piston of circular transverse cross sectional shape, in a disc brake wherein the piston is slidably received in a cylinder portion of a caliper such that the centerline of the piston is parallel to an axis of rotation of a disc rotor, the piston being moved with a brake fluid pressure applied to the cylinder portion, and urging the brake pad against a friction surface of the disc rotor to thereby restrain a rotary movement of the disc rotor, wherein the improvement comprises:

the anti-squeal shim being gripped, upon application of the brake fluid pressure to the cylinder portion, only by radially-outer portions of opposite abutting surfaces of the piston and the backing plate which are located adjacent to the periphery of the piston and are spaced from the centerline of the piston in a radially outward direction of the disc rotor.

The anti-squeal shim constructed according to the invention as described above, is capable of effectively restraining vibrations of the brake pad and the disc rotor during application of a brake, and thereby preventing the disc brake from producing a high-pitched, piercing brake noise, in a sufficiently effective manner. It is considered that this relatively high anti-squeal capability of the instant shim is derived from a change in the vibration mode of the brake pad and disc rotor so as to reduce their vibrations which contribute to the generation of a squeal. It seems that the above change in the vibration mode results from the function of the anti-squeal shim to bind or restrict only those portions of the brake pad and the disc rotor at which the magnitude of vibrations is maximum, that is, a central portion of the brake pad as viewed in the direction of length, and a radially outer portion of the disc rotor.

According to one embodiment of the invention, the anti-squeal shim comprises a working portion gripped by the radially-outer portions of the piston and the backing plate. The working portion extends in a circumferential direction of the disc rotor.

In an advantageous form of the above embodiment, the working portion is gripped by the piston and the backing plate at a central part thereof corresponding to not greater than one third of a diameter of the piston, preferably, not greater than one fourth of a diameter of the piston, as viewed in the radial direction of the disc rotor.

In accordance with another advantageous form of the above embodiment, the anti-squeal shim comprises: a working portion which is gripped by the radially-outer portions of the piston and the backing plate and which extends in a circumferential direction (along the periphery) of the disc rotor; a pair of opposed extensions which extends from opposite ends of the working portion, respectively, toward a radially central part of the disc rotor and which are spaced from each other by a distance greater than a diameter of the piston; and mounting portions extending from the working portion, and from ends of the opposed extensions remote from the working portion, the mounting portions engaging opposite end faces of the backing plate on radially outer and inner sides of the disc rotor.

At least one of the mounting portions may engage a recess formed in one of the opposite end faces of the backing plate, to prevent the anti-squeal shim from moving in the circumferential direction of the disc rotor. The pair of opposed extensions may have a pair of engaging tabs engaging the periphery of the piston to prevent the anti-squeal shim from moving in the circumferential direction of the disc rotor.

BRIEF DESCRIPTION OF THE DRAWINGS

The above and other objects, features and advantages of the present invention will become more apparent from reading the following detailed description of preferred embodiments of the invention, when considered in connection with the accompanying drawings, in which:

FIG. 1 is a front elevational view of one embodiment of an anti-squeal shim of the invention attached to a backing plate of an inner pad of a disc brake;

FIG. 2 is an elevational view in cross section of an assembly of the anti-squeal shim and the inner pad, taken along line II—II of FIG. 1;

FIG. 3 is a side elevational view in cross section of the disc brake equipped with the anti-squeal shim of FIG. 1;

DETAILED DESCRIPTION OF THE PREFERRED EMBODIMENTS

Figure 4:
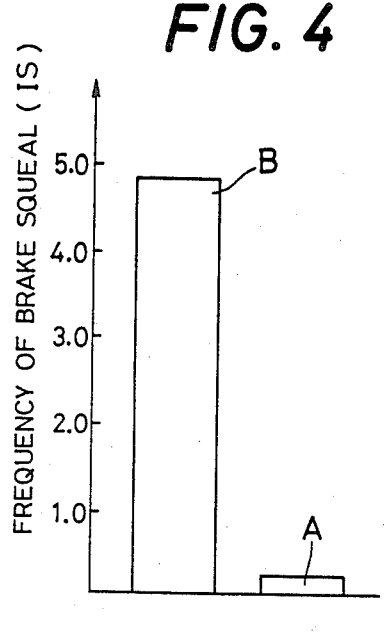
FIG. 4 is a graph showing the frequency of squeal of the disc brake of FIG. 1, in comparison with that of a disc brake equipped with a conventional anti-squeal shim.

To further clarify the concept of the present invention, preferred embodiments of the invention will be described in detail, by reference to the drawings.

Referring to a front elevational view of FIG. 3 showing in cross section a disc brake equipped with one embodiment of an anti-squeal shim 10 of the invention, there is shown a disc rotor 12 which is rotatable together with a drive wheel of an automotive vehicle. The disc rotor 12 has opposite friction surfaces 14, 14. A pair of brake pads, an inner pad 16 and an outer pad 18 of a generally rectangular shape are disposed on opposite sides of the disc rotor 12, such that the two pads 16, 18 face the corresponding friction surfaces 14, 14. Each of these inner and outer pads 16, 18 consists of a plate-like friction member 20 and a metallic backing plate 22 fixed to the friction member 20 at their mating surfaces. The inner and outer pads 16, 18 are supported by a mounting bracket 24 secured to a frame of the vehicle, so that the pads 16, 18 are movable in a direction parallel to an axis of rotation of the disc rotor 12. Straddling over the pads 16, 18 and the periphery of the disc rotor 12, there is disposed a caliper 26 which is supported by a pair of slide pins (not shown) fixed to the mounting bracket 24, so that the caliper 26 is movable in the direction along the rotating axis of the disc rotor 12.

The caliper 26 has a cylinder portion 30 facing the inner pad 16. The cylinder portion 30 has a bore which accommodates a piston 28 having a centerline parallel to the rotating axis of the disc rotor 12. The piston 28 is slidable along the axis of the rotor 12. The caliper 26 further has a reaction jaw portion 32 facing the outer pad 18. Upon application of a brake fluid pressure to the cylinder portion 30, the piston 28 is moved to urge the inner pad 16 against the inner friction surface 14 of the disc rotor 12, while the reaction jaw portion 32 is moved by reaction to urge the outer pad 18 against the outer friction surface 14 of the disc rotor 12. As a result, a torque applied to the inner and outer pads 16, 18 through their frictional contact with the disc rotor 12 are received by the mounting bracket 24, whereby the rotation of the disc rotor 12 and consequently of the drive wheel of the vehicle is restrained.

As shown in FIGS. 1 and 2, the previously indicated anti-squeal shim 10 in the form of the thin sheet is attached to the backing plate 22 such that the shim 10 is in contact with the rear surface of the backing plate 22 on the side of the piston 28. This anti-squeal shim 10 is provided for avoiding the generation of a high-pitched, piercing brake noise so-called "squeal", as described later in detail. When the piston 28 is forced into abutting contact with the inner pad 16, an urging force of the piston 28 is imparted, through the anti-squeal shim 10, to only an upper central part of the inner pad 16, which is located in the middle of the pad 16 in the direction of its length perpendicular to the rotating axis of the disc rotor 12, and which faces a radially outer portion of the disc rotor 12.

As seen in FIG. 1, the anti-squeal shim 10 comprises: a working portion 34 which extends circumferentially around the disc rotor 12 and which is adapted to be squeezed between the piston 28, and the backing plate 22 of the inner pad 16; an outer tongue portion 35 which extends from a central part of the working portion 34 in the radially outward direction of the disc rotor 12, and which engages one of end faces of the backing plate 22 that is located adjacent to the periphery of the disc rotor 12; a pair of opposed extensions 36, 36 which extends from opposite ends of the working portion 34 toward a central part of the disc rotor 12; and a pair of inner tongue portions 37 which extend from free ends of the respective extensions 36, 36 and which engage the end face of the backing plate 22 opposite to the end face engaging the outer tongue portion 35, i.e., engage the end face which is located on the side of the center of the disc rotor 12.

The working portion 34 has a generally arcuate outer edge 38 along the periphery of the disc rotor 12. The outer edge 38 has a curvature which is slightly larger than that of an edge 40 of the end face of the backing plate 22 which engages the outer tongue portion 35. The working portion 34 further has a linear inner edge 42 on the radially inward side of the disc rotor 12. The linear inner edge 42 is perpendicular to a line which extends in the radial direction of the disc rotor 12 and passes the longitudinal center of the inner pad 16. Namely, the inner edge 42 is parallel to the direction of length of the inner pad 16. The anti-squeal shim 10 is positioned so that the periphery of the piston 28 is located adjacent to the arcuate outer edge 38. A dimension between the outer and inner edges 38 and 42 at a central part of the working portion 34 is determined so that the central part of the working portion 42 may contact a radially outer portion of the piston 28 corresponding to one fourth of the diameter of the piston, or slightly less than that, as measured in the radial direction.

The previously indicated outer tongue portion 35 is formed as an integral portion of the central part of the working portion 34, such that the outer tongue portion 35 extends from the outer edge 38 in the form of letter J. As most clearly shown in FIG. 2, the tip of the J-shaped outer tongue portion 35 fits in a recess 43 formed in the end face of the backing plate 22 of the inner pad 16.

The opposed extensions 36, 36 are spaced from each other by a distance larger than the outside diameter of the piston 28, and are disposed substantially symmetrically with respect to the piston 28. The spaced-apart opposed extensions 36, 36 extend parallel to each other to a position adjacent to but short of the end face of the backing plate 22 on the radially inner side of the disc rotor 12. The inner tongue portions 37, 37 formed at the ends of the opposed extensions 36, 36 take the shape of letter J, like the outer tongue portion 35. The J-shaped inner tongue portions 37, 37 are held in abutting contact with the appropriate end face of the backing plate 22. With the outer and inner tongue portions 35, 37, 37 held in engagement with the backing plates 22, the anti-squeal shim 10 is fixed to the inner pad 16. Thus these tongue portions 35, 37, 37 serve as mounting portions for fixing the shim 10 to the inner pad 16.

Figure 6:
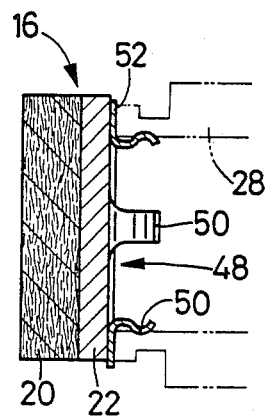
FIG. 6 is an elevational view in cross section of the conventional anti-squeal shim of FIG. 5.
Figure 5:
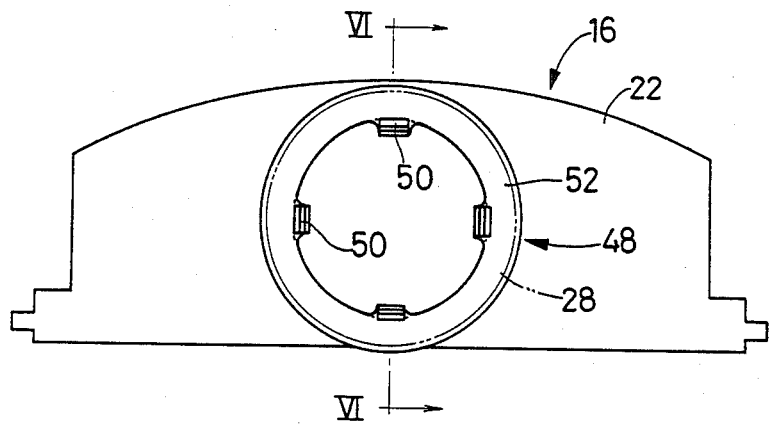
FIG. 5 is a view similar to FIG. 1, showing the anti-squeal shim of the conventional disc brake used for the comparison in FIG. 4, attached to a backing plate of an inner pad.

Referring next to FIG. 4, there is shown a frequency at which a squeal noise occurs on the disc brake equipped with the anti-squeal shim 10, as compared with a frequency of squeal on a disc brake equipped with a conventional anti-squeal shim. A test was conducted under the same braking conditions. The conventional anti-squeal shim used in the test is indicated at 48 in FIGS. 5 and 6. The anti-squeal shim 48 has plural fixing tongues 50 by which the shim 48 is attached to the piston 28. The shim 48 is provided with a working portion 52 which is urged against the backing plate 22 of the inner pad 16 and which covers the entire area of the piston 28. Reference character A in FIG. 4 indicates measurement data of the disc brake equipped with the anti-squeal shim 10 constructed according to the invention while reference character B indicates measurement data of the disc brake provided with the conventional anti-squeal shim 48 of FIGS. 5 and 6. The graph in FIG. 4 reveals that the anti-squeal shim 10 of the instant embodiment is more effective in preventing the generation of a squeal sound from the disc brake.

Figure 7:
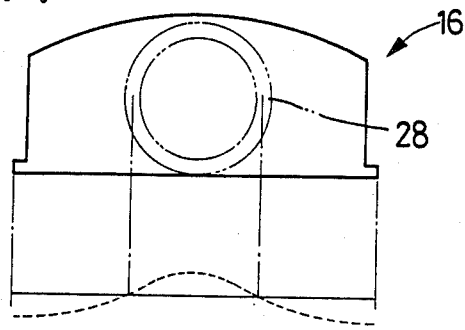
FIGS. 7 and 8 are views indicating modes of vibrations of the inner pad equipped with the anti-squeal shim of FIG. 5, and of a disc rotor, respectively, in a plane perpendicular to the disc rotor.
Figure 8:
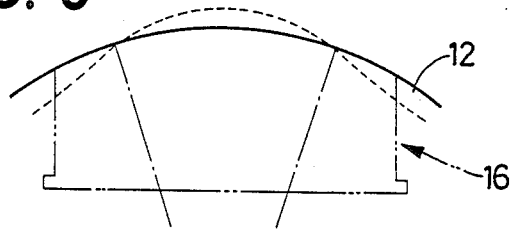

It appears that the superiority of the anti-squeal shim 10 to the anti-squeal shim 48 is derived from the arrangement wherein the working portion 34 is disposed only in an area between the radially outer portion of the piston 28 and the corresponding outer portion of the backing plate 22 of the inner pad 16. More specifically, it is considered that the radially outer portions of the inner pad 16 and the disc rotor 12 which correspond to the working portion 34 are concentratedly bound by the working portion 34, upon application of a brake, and as a result, the vibrations of the inner pad 16 and the rotor 12 may be effectively attenuated or restrained. Where the conventional anti-squeal shim 48 is used, the inner pad 16 and the rotor 12 tend to vibrate in a mode as illustrated in FIGS. 7 and 8. When the anti-squeal shim 10 according to the invention is used, this mode of vibration is well restrained.

While the invention has been described in its preferred embodiment for illustrative purpose only, it is to be understood that the invention is not confined to the precise disclosure of the illustrated embodiment, but may be otherwise embodied.

Figure 9:
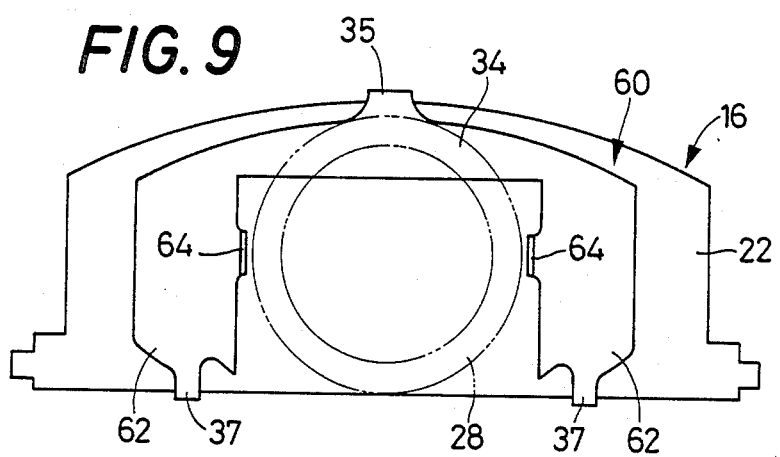
FIG. 9 is a view corresponding to FIG. 1, showing another embodiment of the invention.

For example, the anti-squeal shim 10 may be modified in dimensions and configuration, depending upon specific requirements in the manufacture and installation. In other words, the principle of the invention may be practiced, as long as the working portion 34 is adapted to contact only a radially outer portion of the piston 28 adjacent to the periphery of the disc rotor 12, and not to contact the other portions, particularly a portion of the piston 28 between its center and the center of the disc rotor 12. An example of modification of the anti-squeal shim according to the invention is illustrated in FIG. 9, wherein an anti-squeal shim 60 has a pair of opposed extensions 62, 62 which are formed with engaging tabs 64 which engage the outer circumferential surface of the piston 28. Described in more detail, a distance between the opposed extensions 62, 62 is selected to be shorter than that between the opposed extensions 36, 36, so that the engaging tabs 64 formed on the opposite inner sides of the opposed extensions 62, 62 may engage the periphery of the piston 28 to prevent the anti-squeal shim 60 from rotating in the circumferential direction of the disc rotor 12. Thus, the function of the outer tongue portion 35 engaging the recess 43 in the preceding embodiment is served by the engaging tabs 64.

Although the working portion 34 of the preceding embodiment is gripped by the backing plate 22 and the piston 28, at its central part corresponding to about one fourth of the diameter of the piston 28, it is possible to change the size of the working portion 34, provided the working portion 34 is gripped at its central part corresponding to not greater than one half of the diameter of the piston 28, as viewed in the radial direction of the disc rotor 12.

While the anti-squeal shim 10 of the preceding embodiment is attached to the inner pad 16, it is possible to fix the shim to the piston 28.

It will be obvious that other changes, modifications and improvements may be made in the invention, in the light of the foregoing teaching and without departing from the spirit and scope of the invention defined in the appended claims.

What is claimed is:

1. An anti-squeal shim interposed between a brake pad with a backing plate attached thereto, and a piston of circular transverse cross sectional shape, in a disc brake wherein the piston is slidably received in a cylinder portion of a caliper such that the centerline of the piston is parallel to an axis of rotation of a disc rotor, the piston being moved with a brake fluid pressure applied to the cylinder portion, and urging the brake pad against a friction surface of the disc rotor to thereby restrain a rotary movement of the disc rotor, said anti-squeal shim comprising:

a working portion which is gripped, upon application of said brake fluid presure to said cylinder portion, only by radially-outer portions of opposite abutting surfaces of said piston and said backing plate which are spaced from said centerline of the piston in a radially outward direction of said disc rotor, said working portion extending in a circumferential direction of the disc rotor;

a pair of opposed extensions which extend from opposite ends of said working portion, respectively, toward a radially central part of said disc rotor and which are spaced from each other by a distance greater than a diameter of said piston;

a first mounting portion extending from said working portion and engaging one of opposite end faces of said backing plate on a radially outer side of said disc rotor; and a pair of second mounting portions extending from respective ends of said opposed extensions remote from said working portion and engaging the other of opposite end faces of said backing plate on a radially inner side of said disc rotor.

2. An anti-squeal shim according to claim 1, wherein said working portion is gripped by said piston and said backing plate at a central part thereof corresponding to not greater than one third of a diameter of the piston.

3. An anti-squeal shim according to claim 1, wherein said working portion is gripped by said piston and said backing plate at a central part thereof corresponding to not greater than one fourth of a diameter of the piston.

4. An anti-squeal shim according to claim 1, wherein at least one of said first portion and second mounting portions engages a recess formed in one of said opposite end faces of the backing plate, to prevent the anti-squeal shim from moving in said circumferential direction of the disc rotor.

5. An anti-squeal shim according to claim 4, wherein said pair of opposed extensions have a pair of engaging tabs engaging the periphery of said piston to prevent the anti-squeal shim from moving in the circumferential direction of the disc rotor.

* * * * *